G. M. EATON.
LOCOMOTIVE DRIVING MECHANISM.
APPLICATION FILED DEC. 14, 1916.
1,274,400.
Patented Aug. 6, 1918.
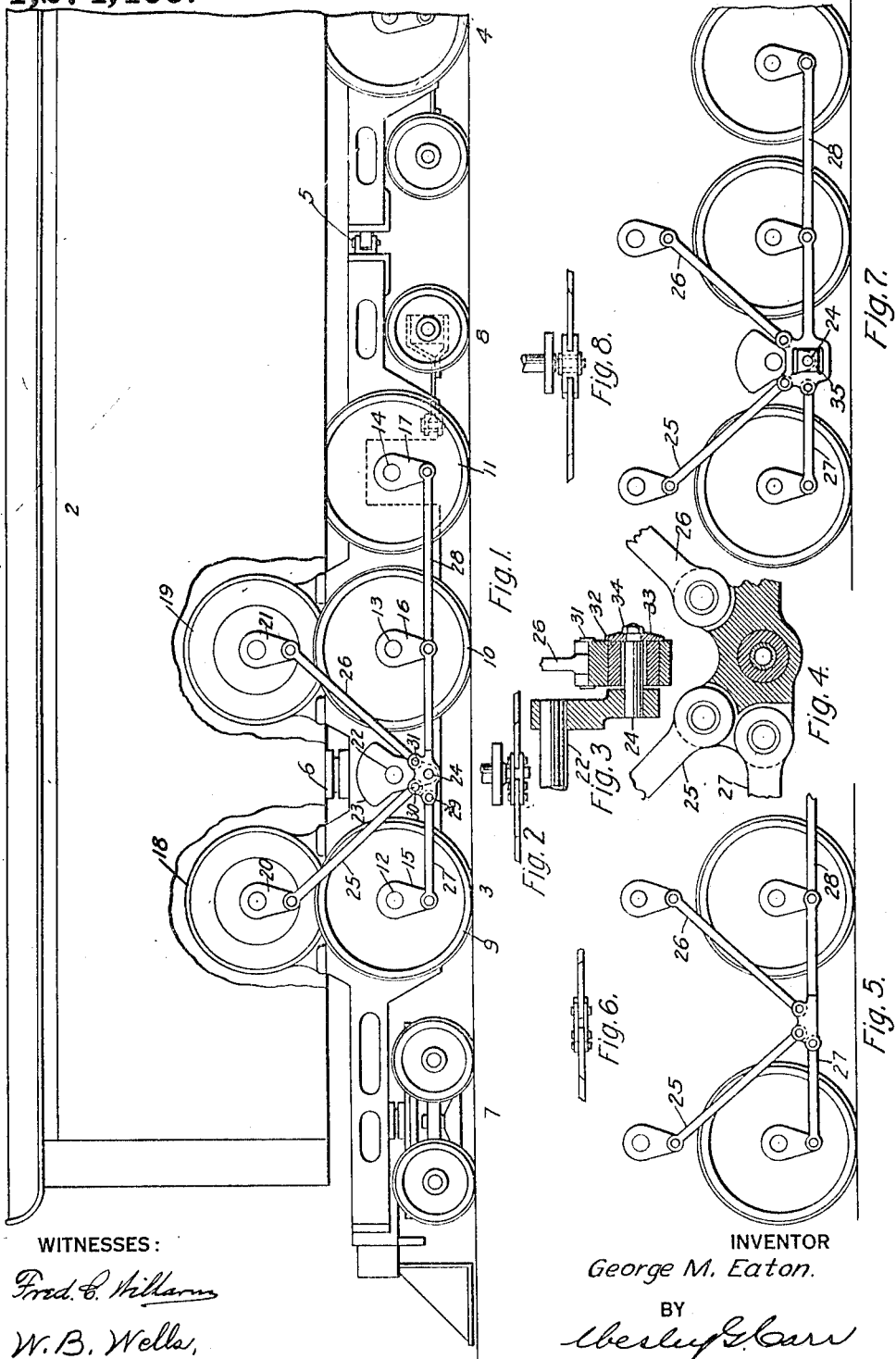
WITNESSES:
Fred E. Williams
W. B. Wells.
INVENTOR
George M. Eaton.
BY
Chesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE DRIVING MECHANISM.

1,274,400.      Specification of Letters Patent.      Patented Aug. 6, 1918.

Application filed December 14, 1916. Serial No. 136,876.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Driving Mechanism, of which the following is a specification.

My invention relates to locomotives and particularly to the connecting means between the propelling motors and the driving wheels of electric locomotives.

One object of my invention is to provide a locomotive that shall have a flexible connection between the propelling motors and the driving wheels which is substantially free from lateral vibration and insures smooth running characteristics at high speed.

Another object of my invention is to provide a locomotive of the above-indicated character which shall be provided with two motor rods and two side rods disposed in the same vertical plane and shall have three of the rods severally pinned to the remaining rod.

Another object of my invention is to provide a locomotive of the above-indicated character which shall have the motor and the side rods so located, relative to each other, that the center lines thereof radiate from one point which rotates about a fixed center.

A further object of my invention is to provide a locomotive having a rod connecting means of the above-indicated character between the propelling motors and the driving wheels that shall be provided with a jack shaft which prevents lateral vibration of the various rods and permits a limited movement of the rods relative thereto in the plane of the rod system.

More specifically, my invention embodies a locomotive having two articulated running gears each of which comprises two auxiliary trucks, a plurality of pairs of driving wheels, two propelling motors located above the driving wheels, and two motor rods and two side rods for joining the motors to the driving wheels. One of the side rods is preferably joined to the jack shaft and is provided with three bifurcated end portions which are pinned to the other side rod and to the two motor rods.

In the accompanying drawing, Figure 1 is a partial elevational view of a locomotive constructed in accordance with my invention; Fig. 2 is a detail plan view of the rods for connecting the motors to the driving wheels; Figs. 3 and 4 are sectional views of the jack shaft illustrated in Fig. 1; Figs. 5 and 6 are partial side-elevational and plan views of a modification of my invention in which the jack shaft and its connections are eliminated; and Figs. 7 and 8 are partial side-elevational and plan views of a modification in which one of the side rods is connected to the jack shaft by means of a scotch yoke.

Referring to Figs. 1 and 2 of the drawing, a locomotive 1 embodies a cab 2 and two articulated running gears 3 and 4 which are connected together by means of the articulated connection 5 and are pivotally connected to the cab 2 by means of the pivotal connections 6, one only of which is shown. Each of the running gears embodies a four-wheel pivotal truck 7, a two-wheel inner radial truck 8 and three pairs of driving wheels 9, 10 and 11. The driving wheels 9, 10 and 11 are provided with axles 12, 13 and 14 which have cranks 15, 16 and 17 mounted thereon. Two motors 18 and 19 are mounted above the driving wheels and are provided with cranks 20 and 21 which are mounted on the armature shafts thereof. A jack shaft 22, which has driving cranks 23 mounted thereon, is located between the pairs of driving wheels 9 and 10. Each driving crank of the jack shaft is provided with a pin 24.

As locomotives in common use are supplied with similar driving rods on the two sides thereof, the rods on one side only are described and referred to in detail. Two motor rods 25 and 26 and two side rods 27 and 28 are provided for joining the motors 18 and 19 to the driving wheels 9, 10 and 11. The motor rods 25 and 26 are respectively pinned, near one end thereof, to the motor cranks 20 and 21. The side rod 27 is pinned to the crank 15 of the pair of driving wheels 9, and the side rod 28 is pinned to the cranks 16 and 17 of the pairs of driving wheels 10 and 11. The side rod 28 is connected to the jack shaft 22 by means of the jack-shaft pin 24 that is provided with three bifurcated projections which include end portions of the motor rods 25 and 26 and the side rod 27 between the arms thereof. Pins 29, 30 and 31 are provided for joining the bifurcated end portions of the side rod 28 to the three rods 27, 25 and 26.

Referring to Figs. 3 and 4 of the drawing, the side rod 28 is directly mounted on a bushing 32 which is loosely fitted to the jack-shaft pin 24 so that the motor and side rods may have a limited free movement, relative to the jack shaft, in the plane of the rod system. A washer 33 and a nut 34 are mounted on the jack-shaft pin 24 to prevent any lateral vibration of the rods 25 to 28, inclusive.

In describing Figs. 5 to 8, inclusive, the various elements are designated by reference characters similar to those used in Figs. 1 to 4, inclusive. In the modification illustrated in Figs. 5 and 6, the jack shaft 22 and its accompanying parts have been eliminated and a rod connecting means between the motors and the driving wheels is obtained which is much lighter in weight. In the modification illustrated in Figs. 7 and 8, a block 35, which is adapted to operate within a slot in the side rod 28, is mounted upon the jack-shaft pin 24. The connection between the rods 25, 26 and 27 and the side rod 28 is similar to the connections illustrated in Fig. 1.

Variations in the structure and arrangement and location of parts may be made without departing from the spirit and scope of my invention, and such modifications are intended to be covered by the appended claims.

I claim as my invention:

1. In a locomotive, the combination with two motor rods and two side rods disposed in the same vertical plane, of means for pivotally joining the two motor rods and one of the side rods to the other side rod.

2. In a locomotive, the combination with a plurality of pairs of driving wheels, and two motors mounted above said driving wheels, of two side rods and two motor rods disposed in the same vertical plane for joining the motors to the driving wheels, one of said side rods having independent pivotal connection with the other three rods.

3. In a locomotive, the combination with a plurality of pairs of driving wheels and a plurality of motors mounted adjacent to said driving wheels, of a jack shaft between the driving wheels, and motor rods and side rods for joining said motors to the jack shaft and to the driving wheels, one of said side rods having independent pivotal connections with each of the other rods.

4. In a locomotive, two motor rods, two side rods, one of said side rods having a point thereon which effects a movement of symmetrical rotation with respect to the two motor rods, and independent pivotal connections between the last-mentioned side rod and the remaining rods, said points of connection being disposed adjacent to said point having a movement of symmetrical rotation.

5. In a locomotive, three pairs of driving wheels, two motors mounted above said driving wheels, side rods for connecting the pairs of driving wheels together, motor rods for connecting the motors to the side rods, and independent connections between one of said side rods and each of the other side and motor rods.

6. In a locomotive, the combination with two motor rods and two side rods disposed in the same vertical plane, of a jack shaft pivotally connected to one of said rods, and independent pivotal connections between the remaining rods and the last-mentioned rod.

7. In a locomotive, the combination with a plurality of pairs of driving wheels, a plurality of motors mounted above said driving wheels, and a jack shaft located between two pairs of said driving wheels, of motor rods and side rods for connecting the motors to the driving wheels, one of said rods having an independent connection with the jack shaft and with each of the other rods.

8. In a locomotive, the combination with a plurality of pairs of driving wheels, two motors mounted above said driving wheels, and a jack shaft disposed between two pairs of said driving wheels, of motor rods and side rods for connecting said motors to the driving wheels, one of said side rods having an independent pivotal connection with said jack shaft and with each of the remaining rods.

9. In a locomotive, two motor rods, two side rods, and a jack shaft, one of said side rods being pivotally mounted on said jack shaft and the remaining rods being pivotally joined to the first-mentioned side rod.

10. In a locomotive, the combination with a plurality of pairs of driving wheels, a plurality of motors mounted above said driving wheels, and a jack shaft disposed between two pairs of said driving wheels, of side rods and motor rods for joining said motors to the driving wheels, and a pin mounted on said jack shaft and having a movement of symmetrical rotation relative to the two motor rods, one of said side rods being joined to said jack shaft pin and the other rods being joined to the last-mentioned side rod.

11. In a locomotive, the combination with a plurality of pairs of driving wheels, a plurality of motors mounted above said driving wheels, and a jack shaft disposed between two pairs of said driving wheels, of side rods and motor rods disposed in the same vertical plane for connecting said motors to the driving wheels, and a pin mounted on said jack shaft and having a movement of symmetrical rotation relative to the two motor rods, one of said side rods being connected to said jack-shaft pin and having independent connections to each of the remaining rods.

In testimony whereof, I have hereunto subscribed my name this 24th day of Nov., 1916.

GEORGE M. EATON.

Copies of this patent may be obtained for five cents each, by addressing the "Commissioner of Patents, Washington, D. C."